(12) United States Patent
Guigne

(10) Patent No.: US 7,715,274 B2
(45) Date of Patent: May 11, 2010

(54) WIDE AREA SEABED ANALYSIS

(75) Inventor: Jacques Guigne, Paradise (CA)

(73) Assignee: Pangeo Subsea Inc. (CA)

( * ) Notice: Subject to any disclaimer, the term of this patent is extended or adjusted under 35 U.S.C. 154(b) by 152 days.

(21) Appl. No.: 11/809,151

(22) Filed: May 31, 2007

(65) Prior Publication Data

US 2008/0298173 A1    Dec. 4, 2008

(51) Int. Cl.
*G01V 1/38* (2006.01)

(52) U.S. Cl. .................................................. 367/15

(58) Field of Classification Search ............... 367/15; 181/101, 122; 73/866.5, 84, 85, 170.32, 73/170.34
See application file for complete search history.

(56) References Cited

U.S. PATENT DOCUMENTS

| | | | | |
|---|---|---|---|---|
| 3,154,169 A | * | 10/1964 | Boucher | 367/73 |
| 3,221,297 A | * | 11/1965 | Smith et al. | 367/41 |
| 3,353,622 A | * | 11/1967 | Erickson | 181/106 |
| 3,442,339 A | * | 5/1969 | Williamson | 175/6 |
| 4,405,036 A | * | 9/1983 | Wener et al. | 181/110 |
| 4,406,242 A | * | 9/1983 | Weeks | 114/242 |
| 6,442,487 B2 | * | 8/2002 | Kim | 702/6 |
| 2002/0066837 A1 | * | 6/2002 | Dunbar | 248/122 |

OTHER PUBLICATIONS

Guigne et al., "Development of an Acoustic Sub-Seabed Interrogator", Ocean, 1989.*

* cited by examiner

*Primary Examiner*—Scott A Hughes
*Assistant Examiner*—Krystine Saito
(74) *Attorney, Agent, or Firm*—Leon D. Rosen

(57) ABSTRACT

A seabed region (18) that lies under a seabed surface area of over one square meter, is analyzed by comparing a core sample taken near the middle of the region and/or data from a geotechnical insitu cone penetrometer installed at the middle of the region, to an acoustic analysis of the region. Locations of the acoustic analysis are precisely correlated to the location of the core test sample or cone test by mounting an acoustic imaging apparatus (16) that holds acoustic transducers (44, 46), on a carriage (26) that is positioned on the core drill (12) or cone penetrometer barrel staff. The carriage of the acoustic imager apparatus is clamped to the core drill when the core drill is not rotating. An arm (30 and/or 32) is supported on the carriage through a frame (28), with at least one acoustic generator (44) and one acoustic echo detector (46) mounted on the arm. The arm can be rotated to positions lying about the drill axis (14) to accurately scan a wide area.

4 Claims, 2 Drawing Sheets

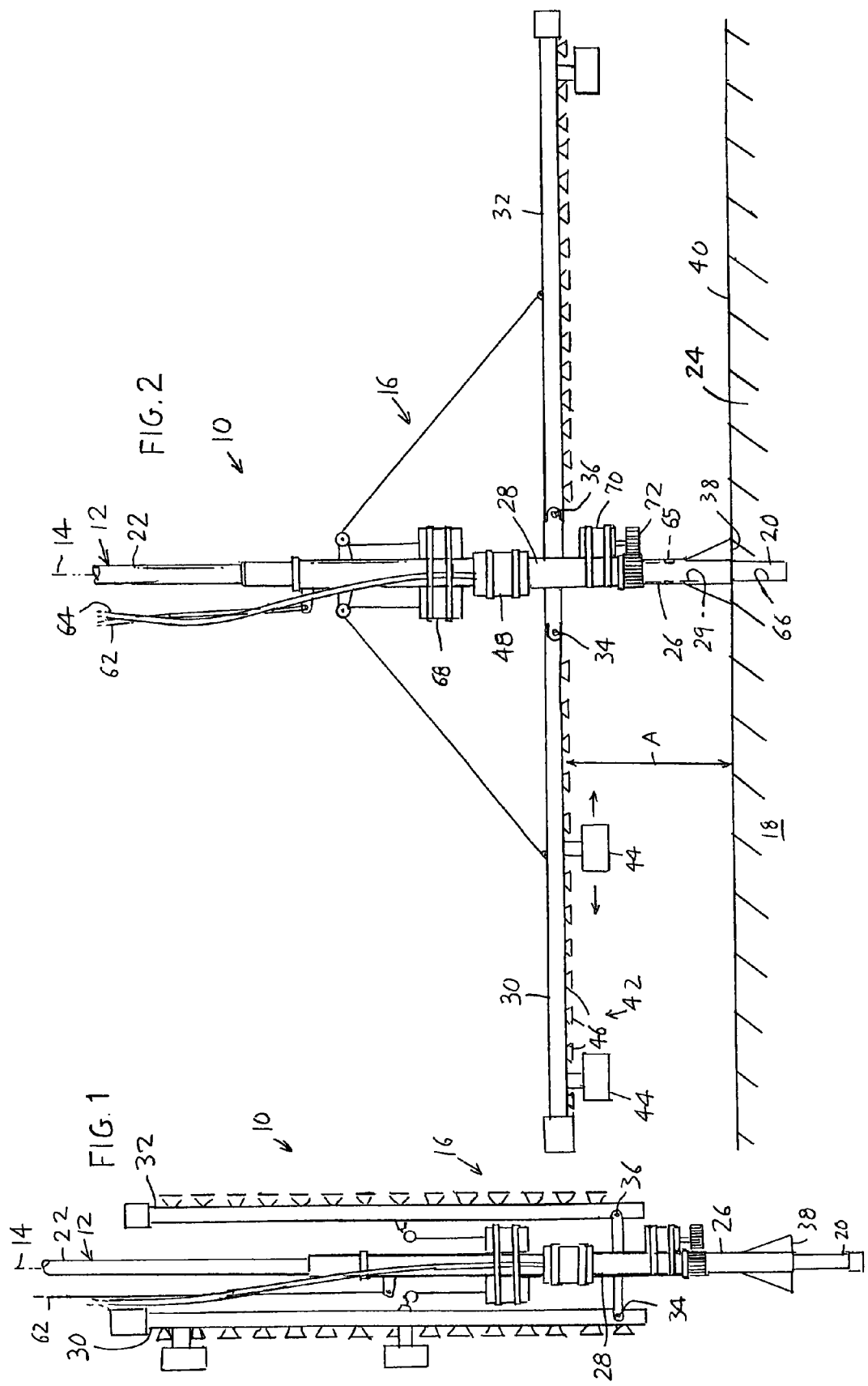

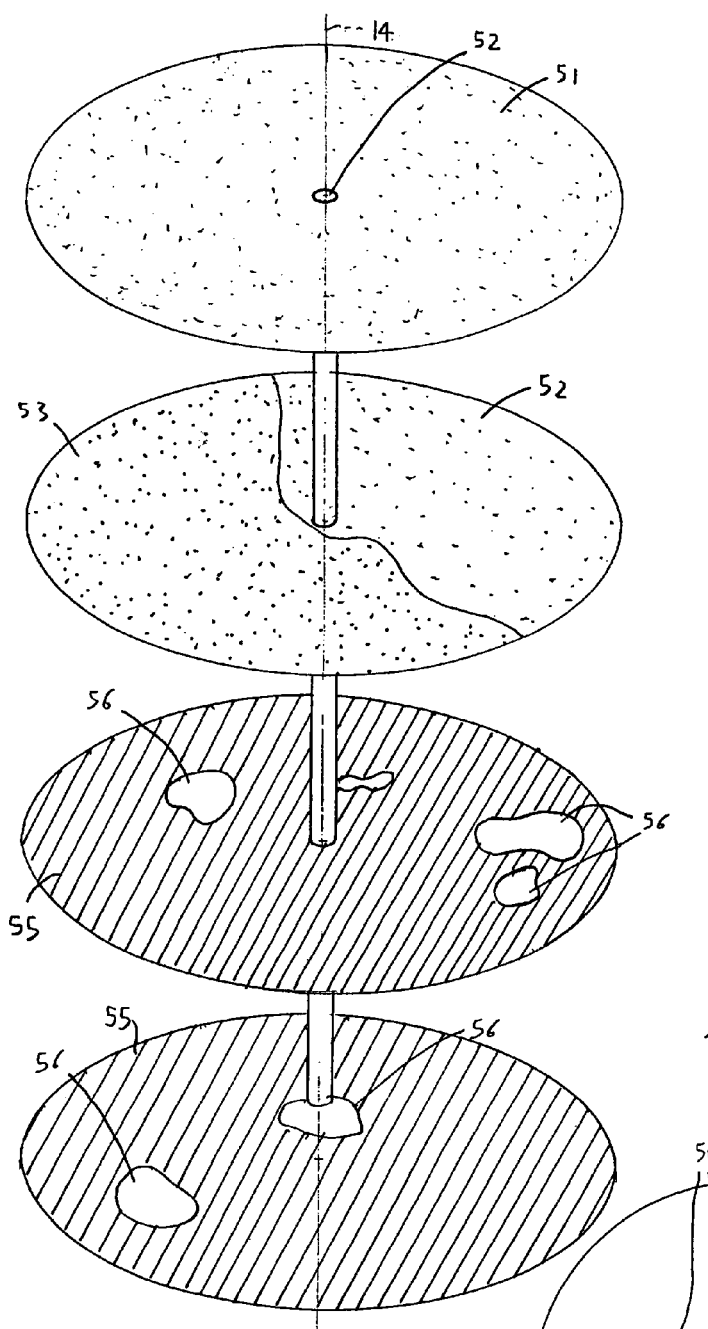
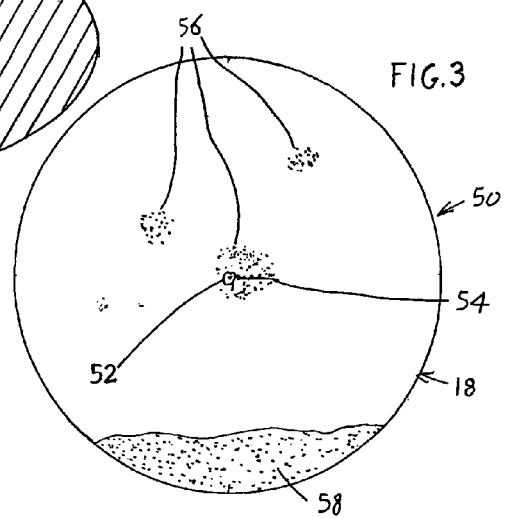
FIG. 4
FIG. 3

WIDE AREA SEABED ANALYSIS

BACKGROUND OF THE INVENTION

There are many cases wherein it is necessary to determine the structure of the sea bed in a limited region. One case is where piles are to be driven into the sea bed to support a construction project such as columns of an offshore hydrocarbon loading platform or of various types of structures that are to lie offshore. If the seabed below a certain depth is consolidated (firm and secure) then piles driven therein will remain stationary, while if piles are driven into soft subsea soil then the piles are not as secure and soil strength must be considered. There is also the costly refusal of the pile by the presence of boulders. One way to determine the condition of the sea bed is to produce samples of the sea bed using core drills, which range in diameter between about 5 centimeters (2 inches) and 30 centimeters (12 inches). Another way is to conduct insitu cone tests. In insitu cone tests, a cone containing sensors is driven into the seabed and seabed characteristics at that location are measured. These two methods will sometimes be collectively referred to herein as seabed penetration measurement, by a seabed data penetrator. Since offshore core drilling and insitu cone tests are expensive and difficult to conduct, only a limited number of locations are drilled or interrogated by a cone. This leads to uncertainty about the condition of the sea bed. For example, if the core sample shows rock material extending down from a predetermined depth, there is uncertainty as to whether the rock is bedrock or is part of a boulder, or is part of a discontinuous hard pan layer.

The seabed can take the form of soft sedimentary lenses, boulders and/or cobble stones, a glacial till (clay, sand, gravel, and boulders intermingled), hard pan (compacted clay soil), mud layers, gas hydrates and gaseous sediments, and frozen soil. Many of these seabed materials are of different conditions when lying in situ (in the sea bed) than when present in a core sample, as where liquid and/or gas escape and/or very fine particulates drop out of the core or the temperature changes. It is possible to analyze the seabed by acoustic (sonar and seismic) apparatus wherein the sound is directed at the sea bed and the echoes are detected. The echoes indicate the reflectivity, attenuation, back-scatter, and velocities of sound at selected frequencies in the materials, from which the characteristics of the sea bed can be estimated. The interpretation of such acoustic sea bed characteristics is a more reliable presentation of the spatial extend of the layers than from a core sample or insitu core test alone. Acoustic imaging can cover a much wider area and at lower cost. It can also provide for lateral confirmation of the physical core properties.

SUMMARY OF THE INVENTION

In accordance with one embodiment of the present invention, a method and apparatus are provided for imaging a sea bed by imaging it, which enables the more accurate evaluation of a region lying under a seabed surface area of more than one square meter. The method includes the use of a core drill or insitu geotechnical cone to produce detailed information about a small volume of the sea floor. The same core drill or cone is used to support and accurately locate a wide area acoustic imaging apparatus during its movement to obtain acoustic data about a large area of the seabed. The acoustic apparatus includes a clamping carriage that can slide down the shank of the core drill (or cone) and then clamp to the core drill. An arm is supported on a frame that is, in turn, supported on the carriage. The arm extends radially away from the drill and holds at least one set of transducers. These transducers include an acoustic generator that produces acoustic radiation and an acoustic detector that detects acoustic radiation that represents echoes from the seabed.

With the core drill (or cone) lying adjacent to, or preferably against the sea floor, before or after a core sample has been drilled, the acoustic generator on the arm is operated to produce acoustic echoes, with the output of the detector recorded. After acoustic readings have been taken at a plurality of locations along the arm, the carriage is rotated around the core drill as in increments of 15°, with acoustic readings taken at each angular position. As a result, a large and more accurate assessment of the sea bed is made, based on both the core sample and the acoustic imaging. A general assessment of the sea bed over the considerable area that has been acoustically imaged, is made more definite by comparing the assessment at areas acoustically similar to where the core sample was taken, to the actual core sample.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a seabed evaluation apparatus of the invention in an installation configuration, with the arms projecting upward from the clamping carriage.

FIG. 2 is a side elevation view of the apparatus of FIG. 1, with the arms deployed to imaging positions.

FIG. 3 is a view of a map of the seabed at a particular depth.

FIG. 4 is an isometric view showing the acoustic characteristics of a seabed at vertically spaced planes, and also showing a drill core.

DESCRIPTION OF THE PREFERRED EMBODIMENTS

FIG. 1 shows a seabed evaluation complex 10 for evaluating a seabed region 18, which includes a core drill 12 that extends along a primarily vertical axis 14 and an acoustic interrogation apparatus, or acoustic imaging apparatus 16. The core drill is of the usual type that includes a hollow drilling portion 20 and a shank 22. The shank is rotated or pounded down by Equipment (not shown) at the sea surface, while the core drill is lowered into the seabed 24 and thereafter pulled up to the surface so a core sample can be recovered. Instead of penetrating the seabed with a core drill, the seabed can be penetrated by an insitu Geotechnical cone, which is a device with sensors that is pounded or otherwise inserted into the seabed. Both devices can be referred to as a seabed data penetrator, which penetrates deep (at least one meter) into the seabed to gather data. The acoustic apparatus 16 of FIG. 1 includes a clamping carriage 26 that is centered on the drill axis and that can clamp (i.e. fix itself) to the drill. The apparatus also includes a rotatable frame 28 that is rotatable about the carriage. The acoustic apparatus also includes a pair of arms 30, 32 that are pivotally connected to the frame at primarily horizontal axes 34, 36 that are circumferential to the drill axis.

FIG. 1. shows the acoustic imaging apparatus 16 during the course of its installation to allow acoustic reading to be taken. The walls of a passage 29 that surround a core drill hollow drilling portion 20 serves as a locator part that locates the imaging apparatus with respect to a core hole 66. The arms 30, 32 have been pivoted up so they extend primarily vertically and parallel to the drill axis to facilitate sliding them down along the drill. With the carriage lower end 38 lying against the sea bed surface 40 (FIG. 2), the arms are pivoted down to the configuration of FIG. 2. At least one transducer set 42 which includes an acoustic generator 44 and an acoustic detector 46 is established at a particular position along each arm 30, 32, such as at the radially outer end of each arm. Applicant notes that FIG. 2 shows two modes for the transmission and reception of acoustic energy. One mode is the use of multiple acoustic detectors 46 whose positions (e.g. fixed on the carriage 26) do not change and with applicant repeatedly repositioning only the acoustic generators 44. In the other mode, co-located transmitter(s) and receptor(s) move along the arm.

With the acoustic generator 44 at a selected position on the arm, the acoustic generator is energized by electronic signals such as short pulses, to produce acoustic waves that penetrate into the seabed 24. To penetrate to a depth of up to 10's of meters, applicant produces acoustic waves of a frequency that is typically 1 KHz to 50 KHz. The acoustic waves generate echoes which are detected by the detectors 46. The times after acoustic transmission when various parts of an echo are detected and the amplitudes of the detected echo parts indicate many characteristics of the seabed. These include the density at various depths (which can indicate rock or soil), and the locations of the top and bottom of boulders (where there are strong reflections) and other materials in the sea bed. The acoustic generator produces a beam that interrogates (produces images of) a tall column-shaped location under the seabed surface.

Each acoustic generator is repeatedly moved along an arm 30, 32 to image many column-like volumes spaced along the arm. After all locations along one arm position are interrogated, the arm is pivoted, as by 15°, about the drill axis 14. At each rotational position, the seabed is insonified (echoes are detected from transmitted sonic pulses) at a plurality of positions of the acoustic generator along each arm. The result is a two-dimensional map such as shown at 50 in FIG. 3 for each of a plurality of depths under the seabed surface. Each arm 30, 32 (FIG. 2) has a length of more than 0.5 meter, so the area of the seabed surface under which the seabed is insonified, is more than one square meter (more than 10 square feet). Preferably, each arm has a length of a plurality of meters, so the area of the seabed under which the seabed is acoustically examined is a plurality of 10's of square meters.

In one example, the drill core indicates rock at location 54, while the map 50 of FIG. 3 indicates rock at 56 which form boulders because they have small horizontal dimensions. The map 50 indicates a wide expanse of rock at 58 which could be bedrock and which could be further interrogated. Sometimes even the core sample is deceiving as where it contains material that changes state under pressure or contains fluids or has been blocked by large particulates during the sampling. FIG. 4 shows the physical core 52 which extends about 20 meters below the seabed surface 40, and shows four acoustic images taken at 5 meter intervals. The acoustic images indicate fine sand at 51, course sand at 53, boulders at 56 and fine clay at 55.

It is important that the positions of locations on the acoustic examination map 50 be accurately correlated to the position of the core sample(s) at 52 for that volume of the sub-seabed. The correlation should be within an inch (2.5 centimeters) in perpendicular lateral directions, and also be accurate in a vertical direction. The acoustic imaging apparatus 16 shown in the figures enables such close correlation of positions.

After applicant lowers the drill (FIG. 1) to the seabed (and usually after a core is drilled), applicant positions a passage 29 in the carriage 26 so it receives the drill 12. Then, applicant lowers the carriage along the drill until the carriage lower end 38 lies against the seabed 24 as in FIG. 2. An umbilical 62 extends from a facility at the sea surface down to the carriage. The umbilical is used to lower the carriage until the carriage lower end contacts the sea floor. A cable 64 also extends to the sea surface. A clamp 65 on the carriage is then operated to clamp the carriage to the drill, at the drill shank. The drill 12 preferably lies in contact with the seabed at the walls of a core hole 66 that has been drilled or that is to be drilled, to accurately position the acoustic apparatus with respect to the core hole. With the carriage fully lowered, a winch 68 is operated to lower the arms 30, 32 until they are horizontal, as shown in FIG. 2. Applicant can use a single arm 30, or can use two arms to interrogate more rapidly.

With the arms lowered, the acoustic generators 44 are energized and the echoes are detected by the receivers 46. After each acoustic insonification by detecting the echoes, the transducer(s) is moved along the arm 30, 32 to a new position. The column-shaped volumes imaged by the transducers 44, 46 usually overlap. After sounding a series of volumes lying under the length of the arm, the arm 30, 32 is rotated to a new position. Data from the interrogation apparatus is stored in a data file 48 although it can be transmitted to a recorder at the sea surface. An actuator apparatus typically formed by an electric motor 70 with gear set 72 or pneumatic or hydraulic actuator, rotates the frame 28 on which the arms 30, 32 are mounted, about the carriage 26 that is, clamped to the drill. Each rotation angle is preferably about 15° and proceeds in typically twelve to twenty-four steps to provide twenty-four angularly spaced arm positions for the two arms. However, if an area of special interest is found (e.g. 58 in FIG. 3) the frame may be rotated in steps of perhaps 1°.

In a system that applicant has designed, the arms 30, 32 each had a length of 7 meters. As a result, a volume of the sea bed was acoustically interrogated which lay under a sea floor area of 68 square meters. The arms were located above the seabed by a distance A of more than a Meter, and actually was about 3 meters above the sea floor, which allowed the pulse initially generated by the generator 44 to produce sound waves of a frequency of 1 KHz to 20 KHz in a broadening beam that passed into the seabed.

The ability to precisely position the transducers 42, enables applicant to employ synthetic aperture sonic techniques to augment the analysis of the seabed. In synthetic aperture sonic techniques, applicant, detects and co-locates the phases of returned (reflected and/or refracted) signals, or echoes, in addition to their amplitude and time of detection (after transmittal), which enables a more precise analysis of seabed characteristics.

Thus, the invention provides a method and apparatus for analyzing a seabed volume that lies under an area of more than one square meter of the sea bed surface. The invention involves the penetration of over one meter of the seabed by a seabed data penetrator, and the acoustic imaging, or interrogation, of a volume in the sea bed that lies around the location where the seabed penetration was made to gather data from a hole in the seabed. This allows the evaluation of a large volume of the sea bed, using only one or a limited number of core drillings and/or insitu cones. This is accomplished by using the acoustic interrogation to evaluate the lateral extent of layers in the seabed and by cross-correlating with the core sample and/or data from the cone to check that acoustic iterations between the two sources of information produce a final consistent calibrated interpretation of conditions of the seabed. Accurate information about the location of the core sample with respect to the locations where the acoustic evaluation data were taken, is assured by positioning the acoustic transducer(s) on an apparatus that is mounted on the core drill, with the bottom of the carriage placed in contact with the seabed while the core drill lies in contact with the sea bed at the location where the core was taken or is to be taken. This is accomplished by mounting the transducers on an arm(s) that rotates about the axis of the drill.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for interrogating a region of a sea bed which includes forcing a seabed data penetrator into a hole at a penetration location in the sea bed and examining the condition of said seabed as indicated by said seabed data penetration, including:

positioning an acoustic imaging apparatus (16) that includes a frame (28), an acoustic transducer device (44, 46), and a locator part (29), including locating said locator part on said penetrator while said penetrator lies at a fixed location with respect to said hole of said penetration location, and using said acoustic transducer device to acoustically interrogate said seabed including directing acoustic energy at the sea floor and detecting echoes thereof;

comparing the properties of the sea bed at selected depths as indicated by said seabed data penetration and as indicated by said recorded echoes;

said step of acoustically interrogating said seabed includes repeatedly moving said acoustic transducer device relative to said locator part to position said acoustic transducer device at each of a plurality of horizontally-spaced locations that all lie over said seabed and performing said step of acoustically interrogating said seabed at each of said location of said acoustic transducer device, while keeping said locator part at a constant location.

2. The method described in claim 1 wherein:

said seabed data penetrator comprises a core drill and said transducer device comprises a plurality of acoustic transducers;

said transducer support comprises a carriage that is fixable in location to said core drill and a frame that is moveably mounted on said carriage to move to different horizontally-spaced locations and that carries said plurality of acoustic transducers;

said step of directing acoustic energy includes moving said frame to locate said acoustic transducers at each of a plurality of horizontally spaced locations over said sea floor.

3. The method described in claim 2 wherein:

said core drill has a primarily vertical axis, said carriage is mounted on said seabed data penetrator, and said frame is pivotally mounted on said carriage to pivot about said primarily vertical axis of said core drill, and said step of moving said frame includes pivoting said frame about said axis of said core drill.

4. The method described in claim 1 wherein:

said seabed data penetrator is a core drill and said acoustic transducer device includes a carriage that is fixable in location to said core drill, said transducer mounted on said carriage, said carriage having a lower end, and said step of using the seabed data penetrator as a positioner includes using the core drill to drill a hole in the seabed and lowering the carriage along said core drill until said lower end of the carriage contacts the sea floor.

* * * * *